United States Patent
Draznin et al.

(10) Patent No.: US 9,603,172 B2
(45) Date of Patent: Mar. 21, 2017

(54) LOW LATENCY CALL TRANSFER

(75) Inventors: Sagiv Draznin, Walnut Creek, CA (US); Steven R. Rados, Danville, CA (US); Lalit R. Kotecha, San Ramon, CA (US); Vikram K. Rawat, San Ramon, CA (US); Patricia Ruey-Jane Chang, San Ramon, CA (US); Yee Sin Chan, San Jose, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 1515 days.

(21) Appl. No.: 12/979,111

(22) Filed: Dec. 27, 2010

(65) Prior Publication Data
US 2012/0163369 A1 Jun. 28, 2012

(51) Int. Cl.
| | |
|---|---|
| *H04L 12/66* | (2006.01) |
| *H04W 76/02* | (2009.01) |
| *H04W 8/26* | (2009.01) |
| *H04W 28/06* | (2009.01) |

(52) U.S. Cl.
CPC .............. *H04W 76/02* (2013.01); *H04W 8/26* (2013.01); *H04W 28/06* (2013.01)

(58) Field of Classification Search
USPC .................................. 370/350–356; 455/445
See application file for complete search history.

(56) References Cited

U.S. PATENT DOCUMENTS

| | | | | |
|---|---|---|---|---|
| 5,708,699 A | * | 1/1998 | Concepcion | H04M 3/533 379/211.02 |
| 6,687,226 B1 | * | 2/2004 | Galyas | H04L 43/0858 370/229 |
| 8,432,871 B1 | * | 4/2013 | Sarnaik | H04W 28/0289 370/331 |
| 2004/0013259 A1 | * | 1/2004 | Zhang | H04M 3/42314 379/229 |
| 2008/0279183 A1 | * | 11/2008 | Wiley | H04L 29/06027 370/389 |
| 2009/0059906 A1 | * | 3/2009 | Cullen | H04L 12/2859 370/352 |
| 2009/0073958 A1 | * | 3/2009 | Xu | H04L 65/80 370/352 |
| 2009/0116473 A1 | * | 5/2009 | Lindoff | H04L 5/0007 370/350 |
| 2010/0220713 A1 | * | 9/2010 | Tynderfeldt | H04W 56/0005 370/350 |

(Continued)

*Primary Examiner* — Khaled Kassim
*Assistant Examiner* — Berhanu Belete

(57) ABSTRACT

A system is configured to receive, from a user device, voice traffic to be sent to another user device; determine whether the voice traffic is local traffic based on whether an eNodeB, associated with the user device, and another eNodeB, associated with the other user device, are served by a particular network device; forward the voice traffic, as non-local traffic, to another network device, associated with a packet data network, for processing when the eNodeB or the other eNodeB are not served by the particular network device; process the voice traffic as local traffic when the eNodeB and the other eNodeB are served by the particular network device; and forward, to the other user device via the other eNodeB, the voice traffic, as local traffic, where the forwarding is performed in a manner that does not include routing the voice traffic via the other network device.

24 Claims, 6 Drawing Sheets

(56) References Cited

U.S. PATENT DOCUMENTS

| | | | |
|---|---|---|---|
| 2010/0232353 A1* | 9/2010 | Hu et al. | 370/328 |
| 2011/0075675 A1* | 3/2011 | Koodli | H04L 12/14 370/401 |
| 2011/0105131 A1* | 5/2011 | Shaheen | H04W 8/082 455/445 |
| 2011/0222466 A1* | 9/2011 | Pance | H04Q 3/0029 370/316 |

* cited by examiner

| SOURCE USER DEVICE ID 405 | SOURCE eNB ID 410 | APN ID 415 | TRAFFIC TYPE 420 | DESTINATION USER DEVICE ID 425 | DESTINATION eNB ID 430 | DESTINATION SGW ID 435 | IP ADDRESS 440 | |
|---|---|---|---|---|---|---|---|---|
| MDN1 | E1 | APN1 | VOICE | MDN2 | E1 | S1 | IP1 | 442 |
| MDN1 | E1 | APNX | VIDEO | — | — | — | — | 444 |
| MDN1 | E1 | APN2 | VOICE | MAC3 | E2 | S1 | IP3 | 446 |
| MDN1 | E1 | APN3 | VOICE | LDN4 | E3 | S2 | IP4 | 448 |

# LOW LATENCY CALL TRANSFER

BACKGROUND

Evolved Packet System (EPS) is a core network architecture associated with the third generation partnership project (3GPP) wireless communication standard. The EPS includes an evolved packet core (EPC) through which traffic, associated with a communication session with a user device, is transported to and/or received from a network (e.g., the Internet, a packet data network, etc.). The EPS also includes a long term evolution (LTE) network, which is a radio access network (RAN) via which the user device communicates with the EPC during the communication session.

The EPS is capable of processing various types of traffic (e.g., video, voice, text, etc.) at higher throughput and/or bandwidth than previous generation architectures (e.g., pre-3GPP networks). The EPS processes calls between user devices that are associated with the same LTE network (e.g., local calls) and/or between user devices that are associated with different network (e.g., non-local calls, long distance calls, etc.). Unfortunately, the EPS processes local calls in a manner similar to that in which non-local calls are processed. Processing the local calls in the manner similar to that in which the non-local calls are processed, may cause network resources (e.g., bandwidth, processing, etc.) to be used inefficiently, increase processing latency when handing local calls, and/or reduce a call-handling capacity of the network.

BRIEF DESCRIPTION OF THE DRAWINGS

FIG. 4 is a diagram of an example low latency call handling data structure according to an implementation described herein;

DETAILED DESCRIPTION OF PREFERRED EMBODIMENTS

Figure 1:
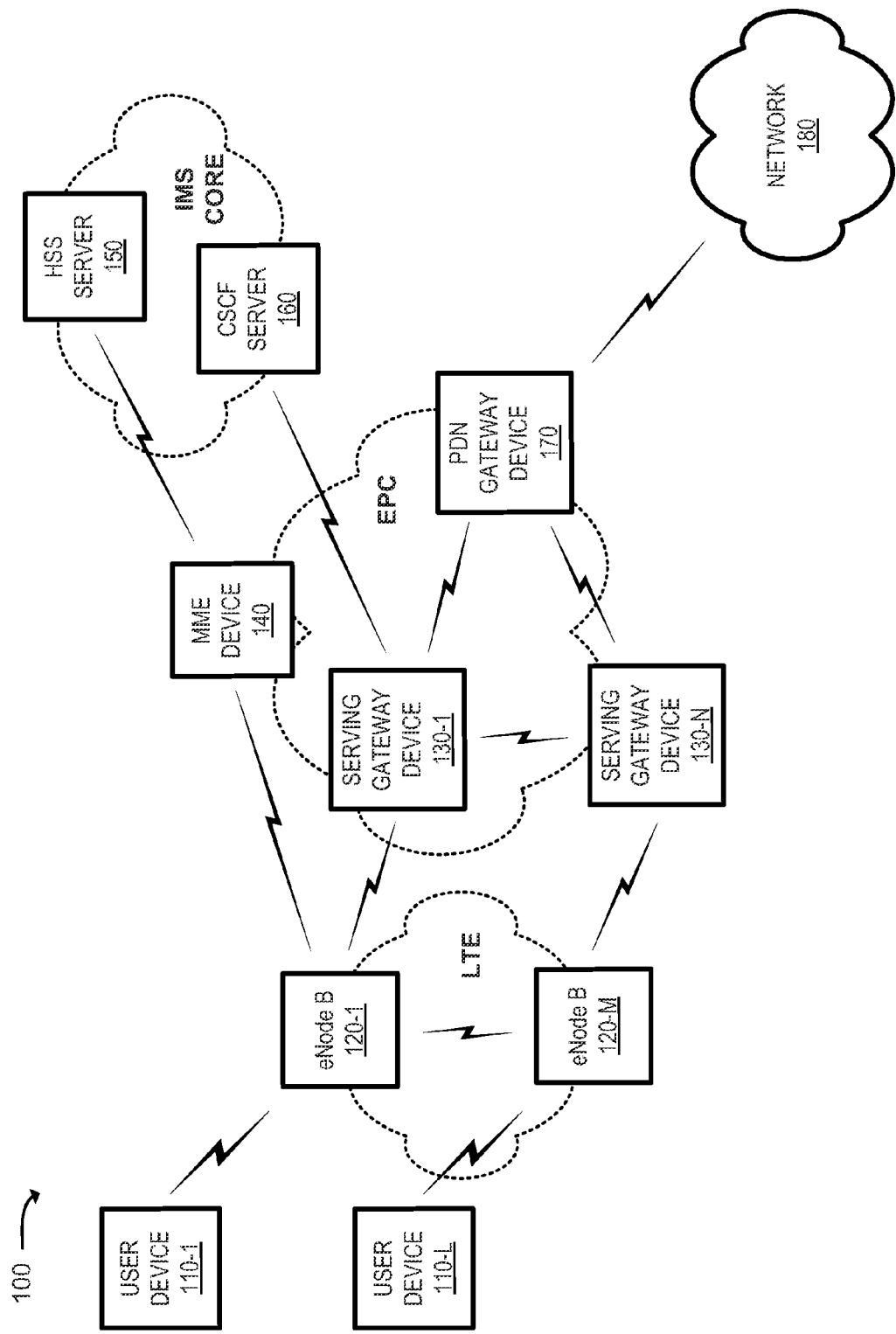
FIG. 1 is a diagram of an example environment in which systems and/or methods described herein may be implemented.

The following detailed description refers to the accompanying drawings. The same reference numbers in different drawings may identify the same or similar elements. Also, the following detailed description does not limit the embodiments.

Systems and/or methods, described herein, may enable a call to be identified as a local call and/or processed in a manner that reduces bandwidth utilization, processing capacity, and/or a number of hops associated with handling the call. As described herein, a low latency call transfer application (hereinafter referred to as a "transfer application") may identify a type of traffic (e.g., voice, video, test, data, etc.) and may process traffic, identified as voice traffic (e.g., a call), using a low latency call transfer operation based on a determination that the voice traffic is a local call.

The term "local call," as used herein, may include a call originating from a user device (e.g., a source user device), that is served by a serving gateway (SGW) device associated with an evolved packet system (EPS) and which is destined for another user device (e.g., a destination user device) that is served by the SGW device, or another SGW device that is associated with the EPS. The term, "non-local call," as used herein, may include a call that originates from a source user device that is not served by the SGW device or the other SGW device and/or a call that is destined for a destination user device that is not served by the SGW device or the other SGW device.

In an example implementation, the transfer application, hosted by an SGW device associated with an EPS, may cause a call, received from a local source user device, via a source eNodeB (e.g., served by the SGW device), to be forwarded to a destination user device, that communicates via the source eNodeB, in a manner that does not include transferring the call to a packet data network (PDN) gateway (PGW) device (e.g., associated with a particular EPS). In another example implementation, the transfer application may cause a call, received from the local source user device, via the source eNodeB, to be forwarded to another destination user device, associated with a destination eNodeB (e.g., served by the SGW device), in a manner that does not include transferring the call to the PGW device. In yet another example implementation, the transfer application may cause a call, received from the local source user device, via the source eNodeB, to be transferred to another SGW device (e.g., associated with the EPS). Transferring the call to the other SGW device may enable the other SGW device to forward the call to a destination user device, via a destination eNodeB (e.g., served by the other SGW) in a manner that does not include transferring the call to the PGW device. The low latency call transfer operation may enable local calls to be processed without transferring the calls to the PGW and/or in a manner that uses less bandwidth and/or processing capacity, fewer hops between network devices, and/or less latency, jitter, or delay.

FIG. 1 is a diagram of an example environment 100 in which systems and/or methods described herein may be implemented. As shown in FIG. 1, environment 100 may include a group of user devices 110-1, . . . , 110-L (where L≥1) (hereinafter referred to collectively as "user devices 110" and individually as "user device 110"), a group of e-Node Bs 120-1, . . . , 120-M (where M≥1) (hereinafter referred to collectively as "eNBs 120" and individually as "eNB 120"), a group of serving gateway devices 130-1, . . . , 130-N (where N≥1) (hereinafter collectively referred to as "SGWs 130" and individually as "SGW 130"), a mobility management entity device 140 (hereinafter referred to as "MME 140"), a home subscriber service server 150 (hereinafter referred to as an "HSS server 150"), a call session control function (CSCF) server 160 (hereinafter referred to as "CSCF server 160"), a packet data network (PDN) gateway device 170 (hereinafter referred to as a "PGW 170"), and a network 180. The number of devices, nodes, and/or networks, illustrated in FIG. 1, is provided for explanatory purposes only. In practice, there may be additional devices, nodes and/or networks; fewer devices, nodes, and/or networks; different devices, nodes and/or networks; or differently arranged devices, nodes and/or networks than illustrated in FIG. 1.

Also, in some implementations, one or more of the devices of environment 100 may perform one or more functions described as being performed by another one or more of the devices of environment 100. Further, MME 140, HSS server 150, and/or CSCF server 160 may be integrated into a single device. In another example, SGW 130 and/or PGW 170 may be integrated into a single device. Devices of environment 100 may interconnect via wired connections, wireless connections, or a combination of wired and wireless connections.

Environment 100 may include an evolved packet system (EPS) that includes a long term evolution (LTE) network and/or an evolved packet core (EPC) that operate based on a third generation partnership project (3GPP) wireless communication standard. The LTE may be a radio access network (RAN) that includes one or more eNBs 120 via which user device 110 communicates with the EPC and/or other user devices 110. The EPC may include SGW 130, MME 140, and/or PGW 170 that enables user device 110 to communicate with network 180, other user devices 110, and/or an Internet protocol (IP) multimedia subsystem (IMSi) core. The IMS core may include HSS server 150 and/or CSCF server 160 and may manage authentication, session initiation, account information, profile information, etc. associated with user device 110.

User device 110 may include any computation or communication device, such as a wireless mobile communication device that is capable of communicating with eNB 120 and/or a network (e.g., network 180). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a camera, a personal gaming system, or another type of mobile computation or communication device. In one example, user device 110 may send traffic to and/or receive traffic from the EPS. In another example, user device 110 may place calls to other user devices and/or receive calls from other user devices 110 via the EPS.

eNB 120 may include one or more devices that receive, process, and/or transmit traffic, such as voice, video, text, and/or other data, destined for and/or received from user device 110. One or more eNBs 120 may be associated with the LTE network that receives traffic from and/or sends traffic to network 180 and/or the IMS core via the EPC. eNB 120 may send traffic to and/or receive traffic from user device 110 via an air interface (via an LTE-Uu interface).

SGW 130 may include one or more devices, or other types of computation or communication devices, that gather, process, search, store, and/or provide information in a manner similar to that described herein. SGW 130 may, for example, aggregate traffic received from one or more eNBs 120 and may send the aggregated traffic to network 180 (e.g., via PGW 170) and/or other devices associated with the IMS core and/or the EPC. SGW 130 may also receive traffic from the other network devices and/or may send the received traffic to user device 110 via eNB 120. For example, SGW 130 may receive an instruction (e.g., as a result of a registration operation, handoff operation, and/or some other operation) from MME 140 to establish a connection (e.g., a tunnel) that permits user device 110 to communicate with other user devices 110 and/or network devices associated with the LTE, EPC, the IMS core, and/or network 180.

In an example implementation, SGW 130 may host a transfer application that enables SGW 130 to perform low latency transfer operations. For example, SGW 130 may receive traffic from user device 110 (e.g., via eNB 120) and may determine whether the traffic is associated with voice, video, text, etc. (e.g., based on an access point name (APN), a class of service (CoS), etc.). An APN identifies particular applications, services, and/or data types associated with traffic being transported and/or handled by the EPS. Additionally, or alternatively, a particular APN may correspond to a packet data network (PDN) or a set of PDNs (e.g., the Internet, an intranet, etc.) that permit access to other applications, services, and/or data. Based on a determination that the traffic is video traffic, high bandwidth traffic, text traffic, etc., the transfer application may transfer the traffic to a PGW 170 to be processed using conventional protocols. If, however, the transfer application determines that the traffic is voice traffic (hereinafter referred to herein as a "call"), the transfer application may determine whether the call is a local call.

For example, the transfer application may determine whether user device 110 from which the call was made (e.g., source user device 110) and/or another user device 110, to which the call is destined (e.g., destination user device 110), are local user devices 110 (e.g., are associated with the EPS). The transfer application may base the determination, of whether the call is a local call, on a look up operation (e.g., using information associated with the source user device 110 and/or information associated with the destination user device 110). The information associated with the source user device 110 and/or information associated with the destination user device 110 may include a device identifier (e.g., a mobile directory number (MDN), a landline directory number (LDN), an international mobile subscriber identity (IMSI), a mobile station international subscriber directory number (MSISDN), a subscriber identity module (SIM) universal resource identifier (URI), etc.) and/or a device address (e.g., a media access control (MAC) address, etc.). If the transfer application determines that the call is not a local call (e.g., when source user device 110 or destination user device 110 are not local devices), then the transfer application may transfer the call to PGW 170 to be processed using conventional protocols.

If, however, the transfer application determines that the call is a local call, then the transfer application may identify (e.g., from the look up operation and/or as a result of a query sent to CSCF server 160) via which eNB 120 and/or SGW 130 to transfer the call to destination user device 110 in a manner that does not include transferring the call to PGW 170. Additionally, or alternatively, the transfer application may assign an IP address to the source user device 110 to be used by user device 110 during the call session with destination user device 110.

MME 140 may include one or more devices, or other types of computation or communication devices, that gather, process, search, store, and/or provide information in a manner similar to that described herein. For example, MME 140 may perform operations associated with a handoff to and/or from the EPS. MME 140 may perform operations to register user device 110 with the EPS, to handoff user device 110 from the EPS to another network, to handoff a user device 110 from the other network to the EPS, and/or to perform other operations. MME 140 may perform policing operations on traffic destined for and/or received from user device 110.

HSS server 150 may include one or more server devices, or other types of computation or communication devices, that gather, process, search, store, and/or provide information in a manner similar to that described herein. For example, HSS server 150 may manage, update, and/or store, in a memory associated with HSS server 150, service profile information associated with user device 110 that includes access point names (APNs) that are permitted for and/or accessible by user device 110, information associated with a user of user device 110 (e.g., a username, a password, a personal identification number (PIN), etc.), rate information, minutes allowed, and/or other information. Additionally, or alternatively, HSS server 150 may include a device that performs authentication, authorization, and/or accounting (AAA) operations associated with a communication session with user device 110.

CSCF server 160 may include one or more server devices, or other types of computation or communication devices, that gather, process, search, store, and/or provide information in a manner similar to that described herein. In one example implementation, CSCF server 160 may execute session initiation protocols (SIPs) associated with establishing a session with user device 110. In an example implementation, CSCF server 160 may be a serving-CSCF server. CSCF server 160 may communicate via network 180 and may process and/or route calls to and/or from user device 110. CSCF server 160 may, for example, route a call received from user device 110 (e.g., via eNB 120) and may route the call to a destination device and/or perform operations associated with monitoring minutes and/or billing information associated with the call.

CSCF server 160 may include a policy and charging rules function (PCRF) that may perform operations that enforce EPS policies associated with a communication session with user device 110. For example, the PCRF may dynamically provide real-time bandwidth allocations and/or controls (e.g., associated with a particular APN) associated with particular applications, network accesses, and/or services provided to user device 110 during a communication session. In another example, the PCRF may dynamically provide a real-time signal flow policy to adapt to changing conditions within the network and/or to manage traffic flow during the communication session.

CSCF server 160 may receive a query from SGW 130 to identify via which eNB 120 and/or other SGW 130 a call is to be routed to a destination user device 110. CSCF server 160 may use information associated with the destination user device 110 on which to base the determination (e.g., from a look up table) via which eNB 120 and/or other SGW 130 the call is to be routed. Based on the determination, CSCF server 160 may send information, associated with the identified eNB 120 and/or the other SGW 130, to SGW 130.

PGW 170 may include one or more devices, or other types of computation or communication devices, that gather, process, search, store, and/or provide information in a manner similar to that described herein. In one example implementation, PGW 170 may include a device that aggregates traffic received from one or more SGWs 130 and may send the aggregated traffic to network 180 and/or the IMS core (e.g., CSCF server 160). In another example implementation, PGW 170 may receive traffic from network 180 and may send the traffic to user device 110 via SGW 130 and/or eNB 120. PGW 170 may perform policing operations on traffic destined for the EPS.

In an example implementation, PGW 170 may host a transfer application that enables PGW 170 to perform low latency transfer operations. For example, PGW 170 may receive traffic from user device 110 (e.g., via eNB 120 and/or SGW 130) and may determine whether the traffic is associated with voice, video, text, etc. (e.g., based on an APN, a CoS, etc.). Based on a determination that the traffic is video traffic, high bandwidth traffic, text traffic, etc., the transfer application may transfer the traffic to another PGW 170 and/or via network 180 to be processed using conventional protocols. If, however, the transfer application determines that the traffic is voice traffic (hereinafter referred to herein as a "call"), the transfer application may determine whether the call is a local call.

For example, the transfer application may determine whether source user device 110 and/or destination user device 110 are local user devices 110 (e.g., are associated with the EPS) in a manner similar to that described above. If the transfer application determines that the call is not a local call, then the transfer application may transfer the call to another PGW 170 and/or to network 180 to be processed using conventional protocols.

If, however, the transfer application determines that the call is a local call, then the transfer application may identify (e.g., from a look up operation and/or as a result of a query sent to CSCF server 160) via which eNB 120 and/or SGW 130 to transfer the call to destination user device 110 in a manner that does not include transferring the call to another PGW 170 and/or network 180. Additionally, or alternatively, the transfer application may assign an IP address to the source user device 110 to be used by user device 110 during the call session with the destination user device 110.

Network 180 may include one or more wired and/or wireless networks. For example, network 180 may include a cellular network, a public land mobile network (PLMN), a second generation (2G) network, a third generation (3G) network, a fourth generation (4G) network, a fifth generation (5G) network, and/or another network. Additionally, or alternatively, network 180 may include a wide area network (WAN), a metropolitan area network (MAN), a telephone network (e.g., the Public Switched Telephone Network (PSTN)), an ad hoc network, an intranet, the Internet, a fiber optic-based network (e.g., a FiOS network), and/or a combination of these or other types of networks. Network 180 may transport traffic to and/or from the EPS (e.g., via PGW 170) and/or another network.

Figure 2:
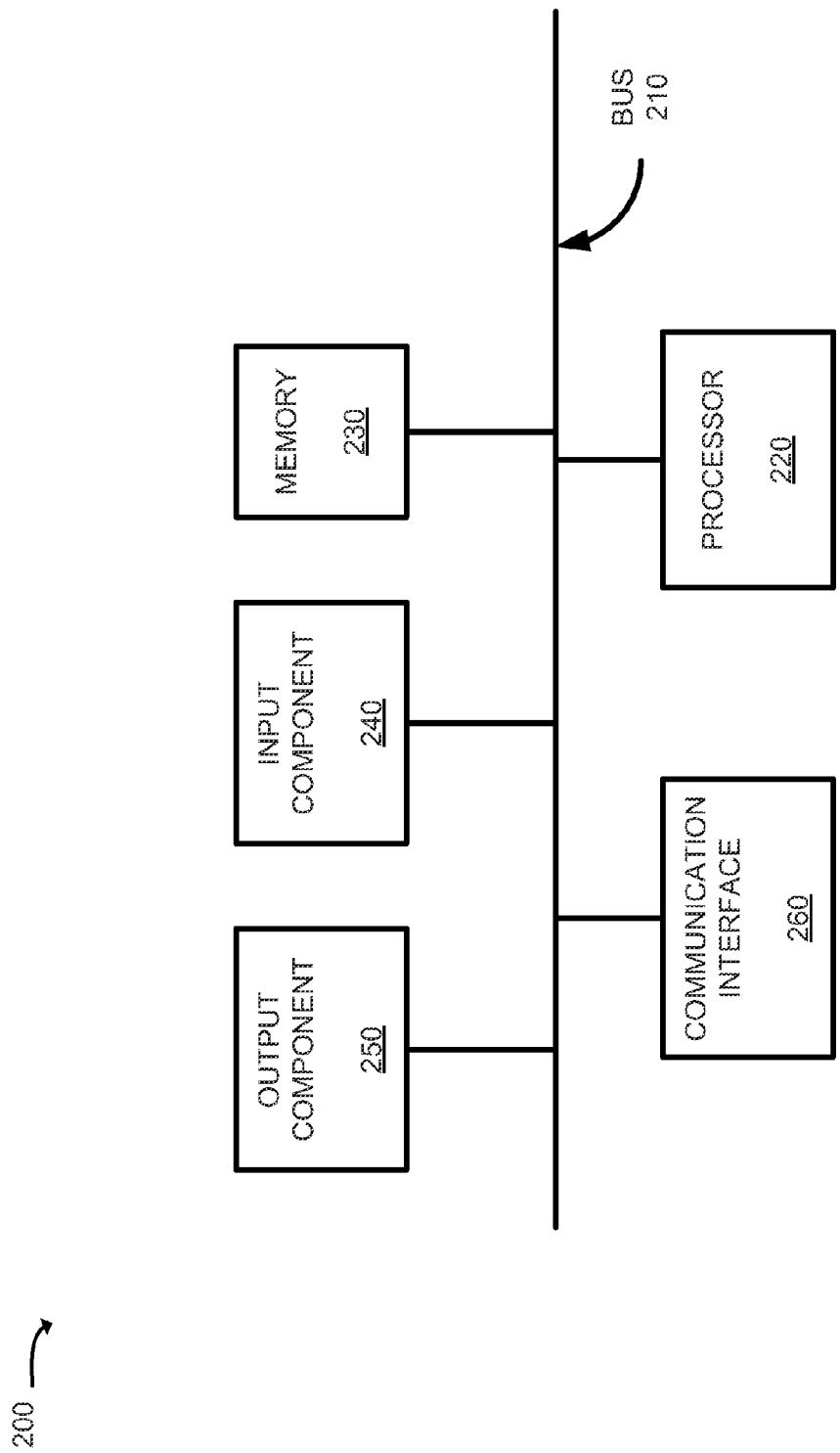
FIG. 2 is a diagram of example components of one or more of the devices of FIG. 1.

FIG. 2 is a diagram of example components of a device 200. Device 200 may correspond to user device 110, MME 140, HSS server 150, and/or CSCF server 160. Alternatively, or additionally, each of user device 110, MME 140, HSS server 150, and/or CSCF server 160 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 180. In one alternative implementation, communication interface 260 may be a logical component that includes input and output ports, input and output systems, and/or other input and output components that facilitate the transmission of data to other devices.

As will be described in detail below, device 200 may perform certain operations relating call processing. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
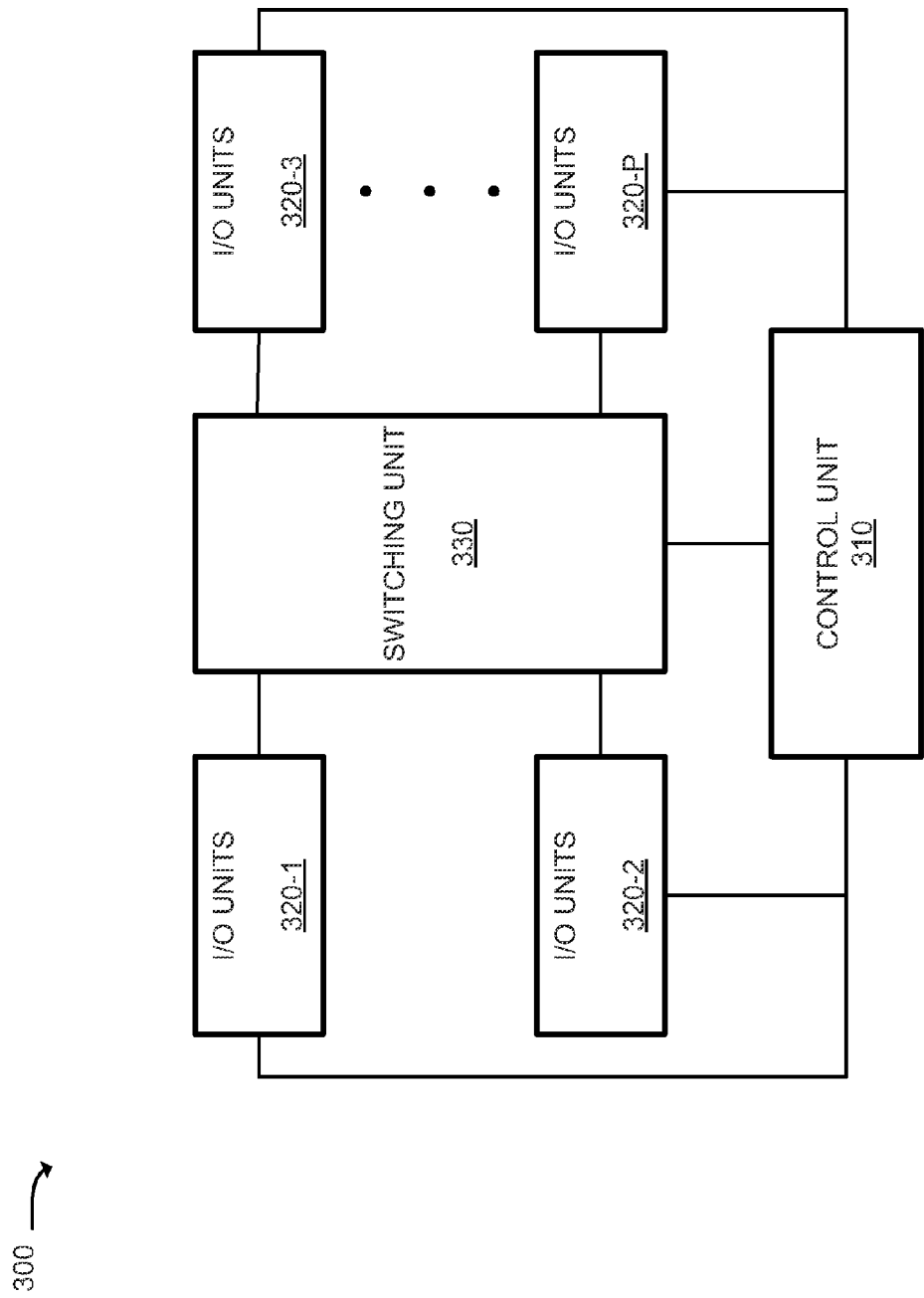
FIG. 3 is a diagram of example components of one or more of the nodes of FIG. 1.

FIG. 3 is a diagram of example components of node 300 that may correspond to one or more of eNB 120, SGW 130, and/or PGW 170. Alternatively, or additionally, eNB 120, SGW 130, and/or PGW 170 may include one or more nodes 300. Node 300 may include a data transfer device, such as a gateway, a switch, a firewall, a network interface card (NIC), a router, a hub, a bridge, a proxy server, an optical add-drop multiplexer (OADM), or some other type of device that processes and/or transfers traffic.

Node 300 may receive network traffic, as one or more packet stream(s), from physical links, may process the packet stream(s) to determine destination information, and may transmit the packet stream(s) out on links in accordance with the destination information. Node 300 may include a control unit 310, a set of input/output (I/O) units 320-1, . . . , 320-P (where P≥1) (hereinafter referred to collectively as "I/O units 320" and individually as "I/O unit 320"), and a switching unit 330.

Control unit 310 may include a processor, a microprocessor, or some form of hardware logic (e.g., an application specific integrated circuit (ASIC) or a field programmable gate array (FPGA)). In one example implementation, control unit 310 may include an Ethernet controller and/or another controller device. Control unit 310 may perform high level management functions for node 300. For example, control unit 310 may maintain the connectivity and manage information/data necessary for transferring packets by node 300. Control unit 310 may create routing tables based on network topology information, create forwarding tables based on the routing tables, and communicate the forwarding tables to I/O units 320. I/O units 320 may use the forwarding tables to perform route lookup for incoming packets and perform the forwarding functions for node 300. Control unit 310 may also perform other general control and monitoring functions for node 300.

I/O unit 320 may include a component or collection of components to receive incoming packets, to process incoming and/or outgoing packets, and/or to transmit outgoing packets. For example, I/O unit 320 may include I/O ports, a packet forwarding component (PFC), an Ethernet interface and/or another type of interface, a central processing unit (CPU), and/or a memory device. I/O unit 320 may include a collection of ports that receive or transmit packets via physical links. I/O unit 320 may also include packet processing component(s), switch interface component(s), Internet processor component(s), memory device(s), etc.

Each of I/O units 320 may be connected to control unit 310 and switching unit 330. I/O units 320 may receive packet data on physical links connected to a network (e.g., network 100). Each physical link could be one of many types of transport media, such as an optical fiber or an Ethernet cable.

I/O units 320 may process incoming packet data prior to transmitting the data to another I/O unit 320 or the network. I/O units 320 may perform route lookups for the data using the forwarding table from control unit 310 to determine destination information. If the destination indicates that the data should be sent out on a physical link, connected to I/O unit 320, then I/O unit 320 may prepare the data for transmission by, for example, adding any necessary headers and/or modifying existing headers, and/or transmitting the data from the port associated with the physical link. If the destination indicates that the data should be sent to another I/O unit 320 via switching unit 330, then I/O unit 320 may, if necessary, prepare the data for transmission to the other I/O unit 320 and/or may send the data to the other I/O unit 320 via switching unit 330.

As will be described in detail below, device 300 may perform certain operations associated with call processing and/or data transfer. Device 300 may perform these operations in response to control unit 310 and/or one or more I/O units 320 executing software instructions contained in a computer-readable medium, such as a memory associated with control unit 310 and/or the one or more I/O units 320, respectively. A memory device may include space within a single physical memory device or spread across multiple physical memory devices. The software instructions may be read into the memory from another computer-readable medium or from another device. The software instructions contained in the memory may cause control unit 310 and/or the one or more I/O units 320 to perform processes described herein. Alternatively, hardwired circuitry may be used in place of or in combination with software instructions to implement processes described herein. Thus, implementations described herein are not limited to any specific combination of hardware circuitry and software.

Switching unit 330 may include one or multiple switching planes to facilitate communication among I/O units 320 and/or control unit 310. In one implementation, each of the switching planes may include a single-stage switch or a multi-stage switch of crossbar elements. Switching unit 330 may also, or alternatively, include processors, memories, and/or paths that permit communication among I/O units 320 and/or control unit 310.

Although, FIG. 3 illustrates example components of node 300, in other implementations, node 300 may include additional components, fewer components, different components, or differently arranged components than those illustrated in FIG. 3 and described herein. Additionally, or alternatively, one or more operations described as being performed by a particular component of node 300 may be performed by one or more other components, in addition to or instead of the particular component of node 300.

FIG. 4 is a diagram of an example low latency call handling data structure 400 (hereinafter referred to as "data structure 400") according to an implementation described herein. In one example implementation, one or more data structures 400 may be stored in a storage device that is included as part of a memory associated with SGW 130 and/or PGW 170. In another implementation, one or more data structures 400 may be stored in a memory, associated with another device or a group of devices, separate from or including the memory associated with SGW 130 and/or PGW 170.

Data structure 400 may include a collection of fields, such as a source user device identifier (ID) field 405 (hereinafter referred to as "source UD field 405"), a source eNB identifier (ID) field 410, an access point name (APN) identifier (ID) field 415, a traffic type field 420, a destination user device identifier (ID) field 425 (hereinafter referred to as "destination UD field 425"), a destination eNB identifier (ID) field 430, a destination SGW identifier (ID) field 435, and an IP address field 440. Although FIG. 4 shows example fields of data structure 400, in other implementations, data structure 400 may include fewer fields, different fields, additional fields, or differently arranged fields than depicted in FIG. 4. Additionally, or alternatively, one or more fields of data structure 400 may include information described as being included in one or more other fields of data structure 400.

Source UD field 405 may store information associated with a source user device 110 from which a call was made. For example, the transfer application may store, in source UD field 405, a device identifier (e.g., MDN, LDN, IMSI, etc.) and/or an address (e.g., a MAC address, etc.) associated with source user device 110. Source eNB ID field 410 may store information associated with eNB 120 via which the source user device 110 is communicating. For example, the transfer application may store, in source eNB ID field 410, a device identifier (e.g., an electronic serial number and/or some other device identifier), a device address (e.g., an IP address, etc.), a cell identifier, etc. associated with source eNB 120. APN ID field 415 may store information associated with an APN, or set of APNs, that corresponds to the traffic being received from source user device 110. In one example, a call may correspond to one APN, traffic associated with video may correspond to another APN, etc. Traffic type field 420 may store information regarding a type of traffic, service, application, etc. associated with traffic received from source user device 110. For example, the transfer application may store, in traffic type field 420, information associated with a call (e.g., voice traffic), video, streaming media, data, etc. based on traffic received from source user device 110.

Destination UD field 425 may store information associated with a destination user device 110 based on information, associated with destination user device 110, obtained from the traffic received from source user device 110. Destination eNB ID field 430 may store information associated with another eNB 120 via which destination user device 110 is communicating. Destination SGW ID field 435 may store information associated with another SGW 130 that serves the destination eNB 120 and/or destination user device 110. IP address field 440 may store an IP address that is to be assigned to source user device 110 when processing a call received from source user device 110 and/or sending a call destined for user device 110. For example, the transfer application may store, in IP address field 440, an IP address that corresponds to an APN associated with a call received from source user device 110.

SGW 130 may receive traffic from source user device 110 via source eNB 120 and the transfer application may store, in data structure 400, information associated with source user device 110 (e.g., MDN1), an identifier (e.g., E1) associated with source eNB 120, and/or an APN (e.g., APN1) associated with the traffic received from source user device 110 (e.g., as shown by ellipse 442). The transfer application may determine whether the traffic received from source user device 110 is a call based on the APN obtained from the received traffic. Based on a determination, that the APN is associated with a call, the transfer application may identify a particular destination user device 110 and/or destination eNB 120 to which the call is to be sent based on information obtained from the call. For example, the transfer application may store, in data structure 400, information associated with the particular destination user device 110 (e.g., MDN2) and/or destination eNB 120 (e.g., E1) (e.g., as shown by ellipse 442).

Based on the information associated with source user device 110 and/or destination user device 110, the transfer application may determine whether the call, received from source user device 110, is a local call. The transfer application may, for example, determine whether source user device 110 and/or destination user device 110 are associated with the same eNB 120 (e.g., source eNB 120), served by the same SGW 130, and/or served by another SGW server 130 (e.g., another SGW 130 that is associated with the EPS and/or a PGW 170 with which SGW 130 is associated). In one example, the transfer application may perform a look up operation to determine whether information, associated with the destination user device 110 and source user device 110, matches information associated with the destination user device 110 and source user device 110 stored in a memory associated with SGW 130. Based on a determination that the information associated with source user device 110 and destination user device 110 matches the stored information associated with source user device 110 and destination user device 110, respectively, the transfer application may determine that the call is a local call. Additionally, or alternatively, the transfer application may, based on the determination that the call is a local call, identify that source user device 110 and destination user device 110 communicate via source eNB 120 and/or that the same SGW 130 serves source user device 110 and destination user device 110. Based on the determination that destination user device 110 is associated with source eNB 120 and/or that the same SGW 130 serves destination user device 110, the transfer application may store, in data structure 400, information associated destination eNB 120 (e.g., E1, which corresponds to source eNB 120) and/or information associated with SGW 130 (e.g., S1) (e.g., as shown by ellipse 442). The transfer application may process the call by assigning an IP address (e.g., IP1) to source user device 110 based on the determination that the call is a local call (e.g., as shown by ellipse 442). The IP address may be obtained based on a look up operation to identify the IP address (e.g., stored in a list of IP addresses within the memory associated with SGW 130), which corresponds to the APN. The transfer application may send the call to destination user device 110 via source eNB 120. The call may include information associated with source user device 110, the assigned IP address, etc.

In another example, the transfer application may determine that other traffic, received from source user device 110 via source eNB 120, is not associated with a call. For example, the transfer application may determine that another APN (e.g., APNX) is associated with traffic that does not correspond to traffic that is associated with voice traffic (e.g., as shown by ellipse 444). Based on the determination that the other traffic is not associated with a call, the transfer application may forward the traffic to PGW 170 to be processed.

The transfer application may determine that a call received from source user device 110 is a local call when source user device 110 and destination user device 110 are served by the same SGW 130 and communicate with SGW 130 via source eNB 120 that is different than destination eNB 120. For example, the transfer application may, in a manner similar to that described above, determine that the call (e.g., associated with APN2) is a local call (e.g., based on another look up operation) and may determine that source user device 110 (e.g., MDN1) and destination user device 110 (e.g., MAC3) are served by SGW 130 (e.g., S1) (e.g., as shown by ellipse 446). The transfer application may also determine that source user device 110 communicates with SGW 130 via source eNB 120 (e.g., E1) and that destination user device 110 communicates with SGW 130 via destination eNB 120 (e.g., E2) (e.g., as shown by ellipse 446). The transfer application may, in a manner similar to that described above, process the call by assigning an IP address (e.g., IP3) (e.g., as shown by ellipse 446) to source user device 110 and may send the call to destination user device 110 via destination eNB 120.

The transfer application may determine that a call received from source user device 110 is a local call when source user device 110 and destination user device 110 are served by different SGWs 130 that are associated with the EPS and/or PGW 170. For example, the transfer application may determine, based on a look up operation, that the call (e.g., associated with APN3) is a local call and may determine that source user device 110 (e.g., MDN1) communicates with SGW 130 via source eNB 120. The transfer application may also determine that destination user device 110 (e.g., LDN4) communicates with another SGW 130 (e.g., S2) via destination eNB 120 (e.g., E3) (e.g., as shown by ellipse 448). The transfer application may, in a manner similar to that described above, process the call by assigning an IP address (e.g., IP4) (e.g., as shown by ellipse 448) to source user device 110 and may send the call to the other SGW 130 to be processed. The other SGW 130 may receive the call and may forward the call to destination user device 110 via destination eNB 120.

In another example implementation, the transfer application may determine that source user device 110 and destination user device 110 are served by different SGWs 130. Based on the determination that source user device 110 and destination user device 110 are served by different SGWs 130, the transfer application may forward a call received from source user device 110 to PGW 170 to be processed.

Figure 5:
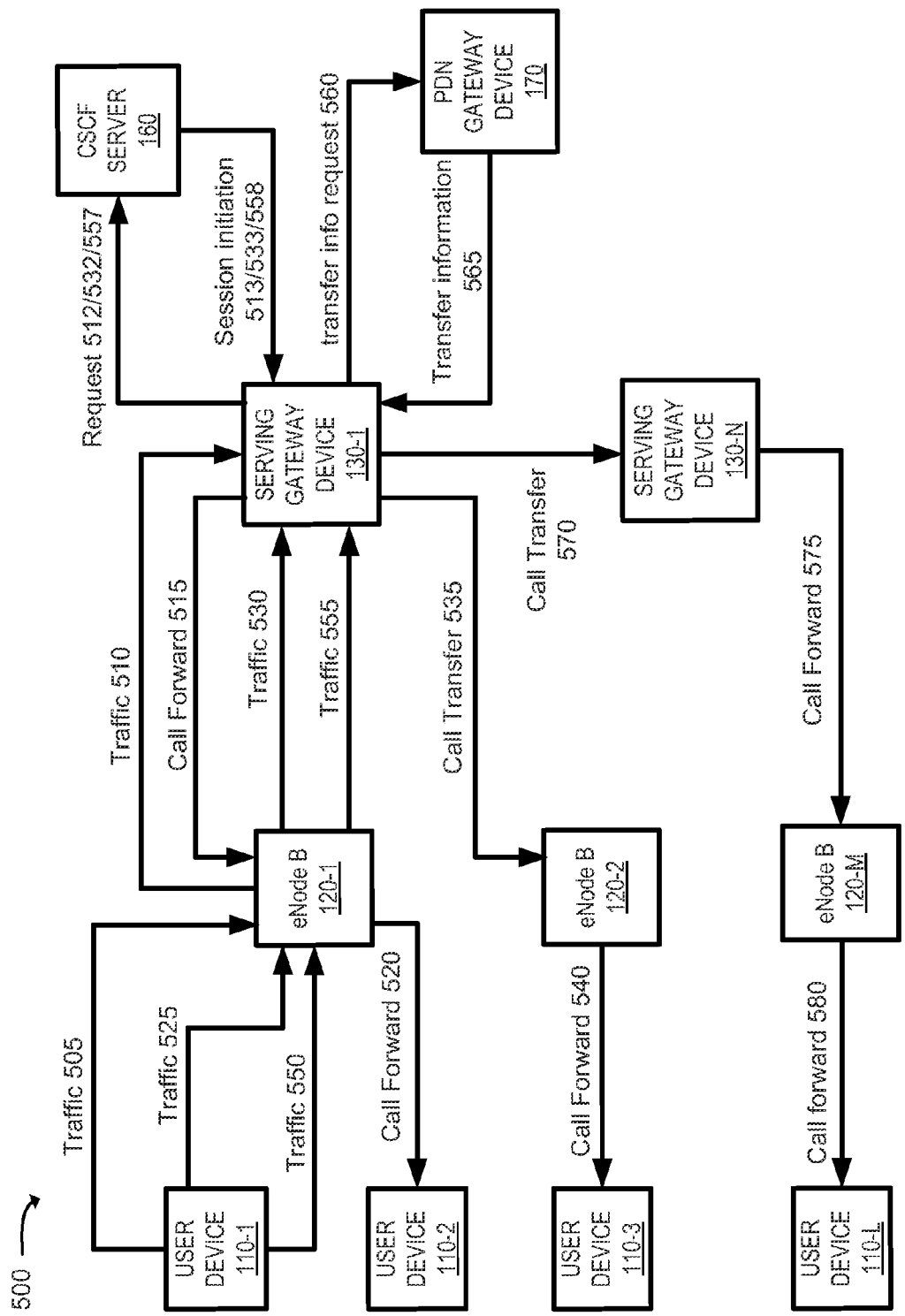
FIG. 5 is a diagram of example interactions between devices of an example portion of the environment of FIG. 1.

FIG. 5 is a diagram of example interactions between devices of an example portion 500 of environment 100. As illustrated in FIG. 5, example environment portion 500 may include user devices 110, eNBs 120, SGWs 130, CSCF server 160, and PGW 170. User devices 110, eNBs 120, SGWs 130, CSCF server 160, and PGW 170 may include the features described above in connection with FIG. 1, 2, and/or 3.

As shown in FIG. 5, source user device 110 (e.g., user device 110-1) may send traffic, as traffic indication 505, to source eNB 120 (e.g., eNB 120-1), that is destined for destination user device 110 (e.g., user device 110-2). Source eNB 120 may receive indication 505 and may send the traffic, to SGW 130, as traffic indication 510. Traffic indications 505 and/or 510 may include information associated with destination user device 110 and/or an APN associated with a type of traffic associated with indication 505 and/or 510. In one example implementation, SGW 130 may send a request indication 512 to CSCF server 160 to establish a communication session with source user device 110. Request indication 512 may be based on a session initiation protocol (SIP). CSCF server 160 may receive request indication 512 and may perform an operation to establish a session with source user device 110 (e.g., by allocating bandwidth resources, monitoring account and/or billing information, enforcing policies associated with the APN, etc.). CSCF server 160 may send session initiation indication 513 to SGW 130 that indicates that a session, with source user device 110, has been established.

SGW 130 may perform a look up operation to determine whether the traffic, received from source user device 110, is associated with voice traffic (e.g., a call). For example, SGW 130 may determine whether the APN, obtained from the traffic indication 510, corresponds to voice traffic. Based on a determination that the APN does not correspond to voice traffic, the transfer application may send the traffic to PGW 170 (e.g., not shown in FIG. 5). If, however, the transfer application determines that traffic indication 510 is a call (e.g., the APN corresponds to voice traffic), the transfer application may determine whether the call is a local call based on a look up operation. For example, the transfer application may perform the look up operation to determine whether information, associated with source user device 110 and destination user device 110 (e.g., stored in a memory associated with SGW 130), corresponds to information associated with eNBs 120 (e.g., source eNB 120 and destination eNB 120, respectively) that communicate with SGW 130 and/or another SGW 130 associated with PGW 170.

Based on a determination that the information associated with source user device 110 and/or destination user device 110, does not correspond to the stored information associated with eNBs 120, the transfer application may determine that the call is not a local call and may forward the call to PGW 170. If, however, the transfer application determines that the information, associated with source user device 110 and/or destination user device 110, corresponds to the stored information associated with eNBs 120, the transfer application may retrieve, from a memory associated with SGW 130, an IP address that corresponds to the APN obtained from the call. The transfer application may assign the IP address to source user device 110 and may transfer the call to destination user device 110. For example, if the transfer application determines, based on the look up operation, that destination user device 110 communicates via source eNB 120 (e.g., eNB 120-1), then the transfer application may forward the call, as call forward indication 515, to source eNB 120. Source eNB 120 may receive call forward indication 515 and may forward the call, as call forward indication 520, to destination user device 110 (e.g., user device 110-2).

In another example, source user device 110 may send other traffic, as traffic indication 525, to source eNB 120, that is destined for destination user device 110 (e.g., user device 110-3). Source eNB 120 may receive indication 525 and may send traffic indication 530 to SGW 130. Traffic indications 525 and 530 may include information associated with destination user device 110 and/or an APN associated with a type of traffic associated with the other traffic. In one example implementation, SGW 130 may send a request indication 532 to CSCF server 160 to establish another communication session, in a manner similar to that described above, with source user device 110. Request indication 532 may be based on the SIP protocol. CSCF server 160 may receive request indication 532 and may perform an operation to establish another communication session with source user device 110. CSCF server 160 may send session initiation indication 533 to SGW 130 that indicates that the other communication session, with source user device 110, has been established.

SGW 130 may, in a manner similar to that described above, perform another look up operation to determine whether the traffic, received from source user device 110 is associated with voice traffic (e.g., a call). Based on a determination that the APN does not correspond to voice traffic, the transfer application may send the other traffic to PGW 170 (e.g., not shown in FIG. 5). If, however, the transfer application determines that the other traffic is a call (e.g., the APN corresponds to voice traffic), the transfer application may, in a manner similar to that described above, determine whether the call is a local call. Based on a determination that the call is not a local call, the transfer application may forward the call to PGW 170 (e.g., not shown in FIG. 5). If, however, the transfer application determines that the call is a local call, then the transfer application may retrieve, from a memory associated with SGW 130, another IP address that corresponds to the other APN obtained from the call. The transfer application may assign the other IP address to source user device 110 and may transfer the call to destination user device 110. For example, if the transfer application determines, based on the look up operation, that destination user device 110 communicates via destination eNB 120 (e.g., eNB 120-2), then the transfer application may transfer the call, as call transfer indication 535, to destination eNB 120. Destination eNB 120 may receive call transfer indication 535 and may forward the call, as call forward indication 540, to destination user device 110 (e.g., user device 110-3).

In yet another example, source user device 110 may send further traffic, as traffic indication 550, to source eNB 120, that is destined for destination user device 110 (e.g., user device 110-L). Source eNB 120 may receive indication 550 and may send traffic indication 555 to SGW 130. Traffic indications 550 and 555 may include information associated with destination user device 110 and/or an APN associated with a type of traffic associated with the further traffic. In one example implementation, SGW 130 may send a request indication 557 to CSCF server 160 to establish a further communication session, in a manner similar to that described above, with source user device 110. Request indication 557 may be based on the SIP protocol. CSCF server 160 may receive request indication 557 and may perform an operation to establish a further communication session with source user device 110. CSCF server 160 may send session initiation indication 558 to SGW 130 that indicates that the further communication session, with source user device 110, has been established.

SGW 130 may, in a manner similar to that described above, perform a further look up operation to determine whether the further traffic, received from source user device 110 is associated with voice traffic (e.g. a call). Based on a determination that the APN does not correspond to voice traffic, the transfer application may send the further traffic to PGW 170 (e.g., not shown in FIG. 5). If, however, the transfer application determines that the further traffic is a call (e.g., the APN corresponds to voice traffic), the transfer application may, in a manner similar to that described above, determine whether the call is a local call. Based on a determination that the call is not a local call, the transfer application may forward the call to PGW 170 (e.g., not shown in FIG. 5).

If, however, the transfer application determines that the call is a local call, then the transfer application may retrieve, from a memory associated with SGW 130, a further IP address that corresponds to the APN obtained from the call. The transfer application may assign the further IP address to source user device 110 and may transfer the call to destination user device 110. For example, the transfer application may determine, based on the further look up operation, that destination user device 110 communicates with another SGW 130 (e.g., SGW 130-N associated with PGW 170) via a particular destination eNB 120 (e.g., eNB 120-M). In another example implementation, SGW 130 may send a request for transfer information, as transfer information (info) request 560, to PGW 170 to obtain information associated with the other SGW 130 (e.g., an identifier, an address, etc.), to which the call is to be transferred. PGW 170 may receive request 560 and may retrieve information associated with the other SGW 130. PGW 170 may send, as transfer information indication 565, the information associated with the other SGW 130 to SGW 130. SGW 130 may, using the information associated with the other SGW 130, to transfer the call, as call transfer indication 570, to the other SGW 130. The other SGW 130 may receive call transfer indication 570 and may forward the call, via destination eNB 120 (e.g., eNB 120-M) as call forward indication 575, to destination user device 110 (e.g., user device 110-L), as call forward indication 580.

Figure 6:
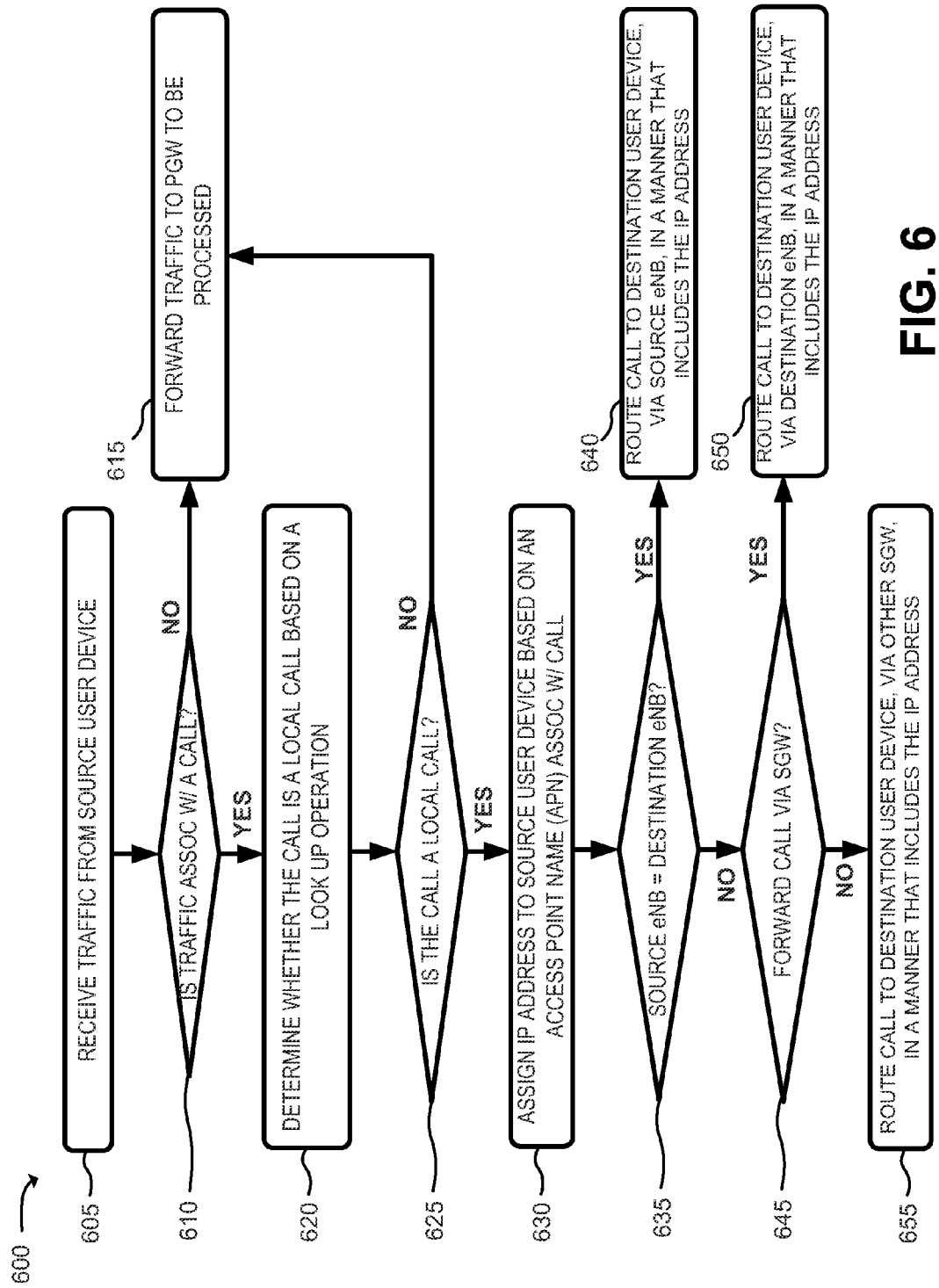
FIG. 6 is a flow chart of an example low latency call transfer process according to an implementation described herein.

FIG. 6 is a flow chart of an example low latency call transfer process 600 according to an implementation described herein. In one example implementation, process 600 may be performed SGW 130. In another example implementation, some or all of process 600 may be performed by a device or collection of devices separate from, or in combination with SGW 130.

As shown in FIG. 6, process 600 may include receiving traffic from source user device 110 (block 605). For example, user device 110 may send traffic to SGW 130 via source eNB 120 (e.g., eNB 120-1) and SGW 130 may receive the traffic. A transfer application, hosted by SGW 130, may obtain, from the traffic, information associated with source user device 110, information associated with source eNB 120, information associated with destination user device 110 (e.g., based on a number called by source user device 110 and/or a destination address, etc.), and/or information associated with an APN regarding a type of data, service, and/or application associated with the traffic.

As also shown in FIG. 6, if the traffic is not associated with a call (block 610-NO), then process 600 may include routing the traffic to PGW 170 to be processed (block 615). For example, the transfer application may determine whether the traffic is associated with voice traffic (e.g., a call). The transfer application may send the traffic to PGW 170 to be processed based on a determination that the traffic is not associated with voice traffic. In one example, the transfer application may use the information associated with the APN to determine whether the traffic is associated with voice traffic based on a look up operation. When performing the look up operation, the transfer operation may, for example, determine that information associated with the APN, stored in a memory associated with SGW 130, corresponds to traffic that is not voice traffic (e.g., streaming video, web services, data, etc.).

In another example implementation, the transfer application may determine that the call is a voice call (e.g., based on the look up operation using the APN) and may determine that the APN corresponds to a voice call that is to be process by PGW 170 (e.g., for special handling, etc.). Based on the determination that the call is to be processed by PGW 170, the transfer application may transfer the voice call to PGW 170 to be processed in accordance with the special handling, etc.

As further shown in FIG. 6, if the traffic is associated with a call (block 610-YES), then process 600 may include determining whether the call is a local call based on a look up operation (block 620). For example, the transfer application may determine, from the look up operation, that the traffic corresponds to a call placed by source user device 110. Based on the determination that the traffic corresponds to the call, the transfer application may determine whether the call is a local call based on information associated with source user device 110 and information associated with destination user device 110. For example, the transfer application may perform a look up operation to identify whether source user device 110 and destination user device 110 are local devices. The transfer application may, in one example, determine whether the information associated with source user device 110 and the information associated with destination user device 110 match information associated with source user device 110 and information associated with destination user device 110, respectively, that is stored in the memory associated with SGW 130.

As yet further shown in FIG. 6, if the call is not a local call (block 625—NO), then process 600 may include routing the traffic to PGW 170 to be processed (block 615). For example, the transfer application may determine that the call is not a local call when the information associated with source user device 110 and/or the information associated with destination user device 110 does not match the stored information associated with source user device 110 and/or information associated with destination user device 110, respectively. Based on the determination that the call is not a local call, the transfer application may send the call to PGW 170 to be processed.

As still further shown in FIG. 6, if the call is a local call (block 625—YES), then process 600 may include assigning an IP address to source user device 110 based on an access point name (APN) associated with the call (block 630). For example, the transfer application may determine that the call is a local call when the information associated with source user device 110 and the information associated with destination user device 110 match the stored information associated with source user device 110 and information associated with destination user device 110, respectively. Based on the determination that the call is a local call, the transfer application may communicate with CSCF server 160 to establish a communication session with source user device 160. CSCF server 160 may, in response to a request to establish a communication session, perform an operation to establish a session with source user device 110 (e.g., by allocating bandwidth resources; monitoring a session time, account information, and/or billing information; enforcing policies associated with the APN; etc.). CSCF server 160 may send a notification to SGW 130 that indicates that the communication session, with source user device 110, has been established.

Based on a determination that the call is a local call and/or the establishment of the communication session, the transfer application may assign an IP address to source user device 110. For example, the transfer application may retrieve an IP address, from the memory associated with SGW 130, that corresponds to the APN associated with the call. The transfer application may assign the IP address to source user device 110, which is to be used during the duration of the communication session.

As also shown in FIG. 6, if source eNB 120 matches destination eNB 120 (block 635—YES), then process 600 may include forwarding the call to destination user device 110, via source eNB 120 in a manner that includes the IP address (block 640). For example, based on the look up operation (e.g., described above with respect to block 620), the transfer application may obtain information associated with destination eNB 120 via which destination user device 110 is to communicate during the communication session. In one example, the transfer application may determine source user device 110 and destination user device 110 communicate with SGW 130 via the same eNB 120 (e.g., when information associated with destination eNB 120 matches information associated with source eNB 120). Based on the determination that source user device 110 and destination user device 110 communicate with SGW 130 via the same eNB 120, the transfer application may forward the call to destination user device 110 via source eNB 120. The call may be forwarded in a manner that includes the IP address assigned to source user device 110 that enables traffic received from destination user device 110, during the communication session, to be sent to source user device 110.

As also shown in FIG. 6, if source eNB 120 does not match destination eNB 120 (block 635—NO) and if the call is to be forwarded via SGW 130 (block 645—YES), then process 600 may include forwarding the call to destination user device 110, via destination eNB 120 in a manner that includes the IP address (block 650). For example, based on the look up operation (e.g., described above with respect to block 620), the transfer application may determine that source user device 110 and destination user device 110 do not communicate with SGW 130 via the same eNB 120 (e.g., when information associated with destination eNB 120 does not match information associated with source eNB 120). Additionally, or alternatively, the transfer application may determine that destination user device 110 communicates with SGW 130 via destination eNB 120 (e.g., in other words, destination user device 110 does not communicate via destination eNB 120 that is associated with another SGW 130). Based on the determination that destination user device 110 communicates with SGW 130 via destination eNB 130 that is associated with SGW 130, the transfer application may forward the call to destination user device 110 via destination eNB 120. The call may be forwarded in a manner that includes the IP address assigned to source user device 110 that enables traffic received from destination user device 110, during the communication session, to be sent to source user device 110.

As also shown in FIG. 6, if source eNB 120 does not match destination eNB 120 (block 635—NO) and if the call is not to be forwarded via SGW 130 (block 645—NO), then process 600 may include forwarding the call to destination user device 110, via another SGW 130 in a manner that includes the IP address (block 655). For example, based on the look up operation (e.g., described above with respect to block 620), the transfer application may determine that source user device 110 and destination user device 110 do not communicate via the same eNB 120 (e.g., when information associated with destination eNB 120 does not match information associated with source eNB 120). Additionally, or alternatively, the transfer application may determine that destination user device 110 communicates with another SGW 130 (e.g., SGW 130-N, that is associated with PGW 170) via destination eNB 120 (e.g., in other words, destination user device 110 does not communicate via destination eNB 120 that is associated with SGW 130). Based on the determination that destination user device 110 communicates with the other SGW 130 via destination eNB 120, the transfer application may transfer the call to the other SGW 130. The other SGW 130 may receive the transferred call and may forward the call to destination user device 110 via destination eNB 120. The call may be transferred to the other SGW 130 and/or forwarded to destination user device 110 in a manner that includes the IP address assigned to source user device 110 that enables traffic received from destination user device 110, during the communication session, to be sent to source user device 110.

Systems and/or methods, described herein, may enable a call to be identified as a local call and/or processed in a manner that reduces bandwidth utilization, processing capacity, and/or a number of hops associated with handling the call. The systems and/or methods may, in one example implementation, cause a call (e.g., voice traffic), received from a local source user device, via a source eNodeB (e.g., served by a SGW device), to be forwarded to a destination user device, that communicates via the source eNodeB, in a manner that does not include transferring the call to a packet data network PGW gateway device. The systems and/or methods may, in another example implementation, cause a call, received from the local source user device, via the source eNodeB, to be forwarded to another destination user device, associated with a local destination eNodeB (e.g., served by the SGW device), in a manner that does not include transferring the call to the PGW device. The systems and/or methods may, in yet another example implementation, cause a call, received from the local source user device, via the source eNodeB, to be transferred to another SGW device (e.g., associated with the PGW device). The systems and/or methods may enable the other SGW device to forward the call to a destination user device, via a destination eNodeB (e.g., served by the other SGW) in a manner that does not include transferring the call to the PGW device. The systems and/or methods may enable local calls to be processed without transferring the calls to the PGW and/or in a manner that uses less bandwidth and/or processing capacity, fewer hops between network devices, and/or less latency, jitter, or delay.

The foregoing description provides illustration and description, but is not intended to be exhaustive or to limit the implementations to the precise form disclosed. Modifications and variations are possible in light of the above disclosure or may be acquired from practice of the embodiments.

While a series of blocks has been described with regard to FIG. 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The term "packet" as used herein, may refer to a datagram, a data item, or a cell; a fragment of a packet, a fragment of a datagram, a fragment of a data item, a fragment of a cell; or another type, arrangement, or packaging of data.

It should be emphasized that the terms "comprises"/ "comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    storing, by a network device, a plurality of access point names (APNs) and information associated with a plurality of user devices that are served by the network device, where each APN, of the plurality of APNs, corresponds to a respective application, service, or type of traffic to be processed by the network device;
    receiving, by the network device and from a first user device, traffic to be sent to a second user device;
    determining, by the network device, whether the traffic is voice traffic based on whether a particular APN that corresponds to the traffic, matches at least one APN, of the plurality of APNs, associated with voice traffic;
    determining, by the network device, whether the voice traffic corresponds to a local call based on whether a first eNodeB, via which the first user device communicates and a second eNodeB, via which the second user device communicates, are served by the network device;
    forwarding, by the network device, the voice traffic, as a call that is not a local call, to another network device, associated with a packet data network, for processing when the first eNodeB or be second eNodeB are not served by the network device;
    processing, by the network device, the voice traffic as a local call when the first eNodeB and the second eNodeB are served by the network device, where the processing includes assigning, to the first user device, an Internet Protocol (IP) address; and
    forwarding, by the network device and to the second user device via the second eNodeB, the voice traffic, as the local call, in order to establish the communication session based on the IP address, where the forwarding is performed in a manner that does not include routing the voice traffic via the other network device.

2. The method of claim 1, further comprising:
receiving, from a third user device, other traffic destined for a fourth user device;
identifying the other traffic as traffic that is not associated with voice traffic; and
forwarding the other traffic to the other network device to be processed based on the identification that the other traffic is not associated with voice traffic.

3. The method of claim 1, where the first eNodeB and the second eNodeB are the same eNodeB.

4. The method of claim 1, where determining whether the voice traffic is the local call further includes:
performing a look up operation to identify whether information associated with the first eNodeB and information associated with the second eNodeB matches some of information associated with a plurality of eNodeBs, that are served by the network device, stored in a memory associated with the network device;
determining that the voice traffic is the local call when the information associated with the first eNodeB and the information associated with the second eNodeB match the some of the information, associated with the plurality of eNodeBs, stored in the memory; and
determining that the voice traffic is not the local call when at least one of the information associated with the first eNodeB or the information associated with the second eNodeB do not match any of the information associated with the plurality of eNodeBs stored in the memory.

5. The method of claim 1, further comprising:
receiving, from the first user device, another call to be sent to a third user device;
determining, by the network device, that the call is a local call based on a determination that a third eNodeB, via which the third user device communicates, is served by a further network device, where the further network device is associated with the other network device; and
transferring the call to the further network device to be processed based on the determination that the third eNodeB is served by the further network device.

6. The method of claim 1, where assigning the IP address when the call is determined to be the local call further includes:
retrieving, from a memory associated with the network device, the IP address, from a list of IP addresses that correspond to a plurality of access point names (APNs), where the IP address corresponds to one of the plurality of APNs that match an APN obtained from the traffic.

7. The method of claim 1, further comprising:
determining that another call, received from the first user device and destined for a third user device, is a local call when the third user device is served by at least one of:
the network device via the first eNodeB,
the network device, via a third eNodeB, where the third eNodeB is different from the first eNodeB, or
a further network device via a fourth eNodeB, where the further network device is associated with the other network device.

8. The method of claim 7, further comprising:
transferring the other call to the further network device based on a determination that the third user device is served by the further network device via the fourth eNodeB, where the transferring permits the further network device to forward the other call to the third user device via the fourth eNodeB.

9. A network device comprising:
a memory to store a plurality of access point names (APNs) and information associated with a plurality of user devices that are served by the network device, where each APN, of the plurality of APNs, corresponds to a respective application, service, or type of traffic to be processed by the network device; and
a processor to:
receive, from a first user device, traffic that is destined for a second user device,
determine whether the traffic is voice traffic based on whether a particular APN, that corresponds to the traffic, matches at least one APN, of the plurality of APNs, associated with voice traffic,
forward, to another network device that is associated with a packet data network, the traffic as a type of traffic that is not the voice traffic when the particular APN does not match the at least one APN, of the plurality of APNs, associated with voice traffic, and
forward the traffic, as a local call, to the second user device when the traffic is determined to be the voice traffic and based on a determination that both information associated with the first user device and information associated with the second user device match some of the information associated with the plurality of user devices stored in the memory,
where forwarding the traffic as the local call is performed in a manner that does not include sending the traffic to the other network device.

10. The network device of claim 9, where, when receiving the traffic that is destined for a second user device, the processor is to:
receive the traffic from a first eNodeB via which the first user device communicates, and
where forwarding the traffic as the local call to the second user device, the processor is to:
send the traffic to a second eNodeB via which the second user device communicates.

11. The network device of claim 9, where the processor is further to:
receive, from one or more user devices, a plurality of traffic that is destined for another one or more user devices, where each of the plurality of traffic is associated with a respective APN, of the plurality of APNs, and
forward, to the other network device, a portion of the plurality of traffic associated with APNs that do not correspond to voice traffic.

12. The network device of claim 11, where the processor is to:
determine whether another portion of the traffic associated with other APNs that correspond to voice traffic is to be processed as local traffic based on information associated with a set of the one or more user devices, from which t he other portion of traffic was received and information associated with a set of the other one or more user devices to which the other portion of traffic is destined, and
forward particular traffic, of the other portion of traffic, to a particular user device, of the set of the other one or more user devices, based on a determination that information associated with the particular user device matches particular information, of the information associated with the plurality of user devices, stored in the memory.

13. The network device of claim 9, where, when forwarding the traffic, as the local call, to the second user device, the processor is further to:
communicate with a further network device associated with initiating communication sessions with user devices, to obtain at least one of: information indicating that a communication session associated with the first user device has been initiated, information associated with a quality of service (QoS) to be enforced regarding the local call, a bandwidth allocation associated with the local call.

14. The network device of claim 13, where, when forwarding the traffic, as the local call, to the second user device, the processor is further to:
retrieve, from the memory, an Internet Protocol (IP) address that corresponds to the particular APN, and
assign, to the first user device, the IP address that is to be used during the communication session associated with the first user device.

15. The network device of claim 9, where the processor is further to:
determine that other traffic, received from a third user device, is voice traffic based a determination that an APN, associated with the other traffic, corresponds to voice traffic,
compare information associated with the third user device to the information associated with the plurality of user devices stored in the memory to determine whether the other traffic is to be processed as other local traffic, and
forward, to the other network device, the other traffic, based on a determination that the information associated with the third user device does not match any information, associated with the plurality of user devices, stored in the memory.

16. A non-transitory computer-readable medium containing instructions executable by at least one processor, the computer-readable medium comprising:
one or more instructions to store information associated with a plurality of eNodeBs that are served by a network device that is associated with another network device that corresponds to a packet data network;
one or more instructions to receive from a first user device and via a first eNodeB, traffic that is to be sent to a second user device via a second eNodeB;
one or more instructions to determine whether the traffic is voice traffic based on an access point name (APN), obtained from the traffic;
one or more instructions to forward the traffic to the other network device when the APN corresponds to traffic that is not voice traffic;
one or more instructions to determine whether the traffic is local traffic when the APN corresponds to the voice traffic, based on whether information associated with the first eNodeB and information associated with the second eNodeB matches any of the information associated with the plurality of eNodeBs;
one or more instructions to forward the traffic, that is determined not to be local traffic, to the other network device based on a determination that the information associated with the first eNodeB or the information associated with the second eNodeB do not match any of the information associated with the plurality of eNodeBs; and
one or more instructions to forward the traffic, as the local traffic, to the second user device and via the second eNodeB based on a determination that the information associated with the first eNodeB and the information associated with the second eNodeB match some of the information associated with the plurality of eNodeBs.

17. The non-transitory computer-readable medium of claim 16, where the one or more instructions to forward the traffic, as the local traffic, further includes:
one or more instructions to retrieve an Internet Protocol (IP) address, of a plurality of IP addresses that correspond to video, streaming media, text, or voice traffic, where the IP address corresponds to the voice traffic; and
one or more instructions to assign the IP address to the first user device.

18. The non-transitory computer-readable medium of claim 16, where the one or more instructions to forward the traffic, as the local traffic, to the second user device is performed in a manner that does not include routing the traffic via the other network device.

19. The non-transitory computer-readable medium of claim 16, further comprising:
one or more instructions to identify other traffic, received from a third user device and via a third eNodeB, as other local traffic based on:
a determination that the third eNodeB is served by the network device; and
a determination that a fourth eNodeB, via which the other traffic is to be forwarded to a fourth user device, is served by the network device.

20. The non-transitory computer-readable medium of claim 16, further comprising:
one or more instructions to identify other traffic, received from a third user device and destined for a fourth user device, as other local traffic based on:
a determination that a third eNodeB, via which the third user device communicates, is served by the network device, and
a determination that the fourth user device communicates via the third eNodeB.

21. The non-transitory computer-readable medium of claim 16, further comprising:
one or more instructions to identify that other traffic, received from a third user device and via a third eNodeB, is non-local traffic based on:
a determination that the third eNodeB is served by the network device, and
a determination that a fourth eNodeB, via which the other traffic is to be sent to a fourth user device, is not served by the network device or is served by a further network device that is associated with the packet data network.

22. The non-transitory computer-readable medium of claim 21, further comprising:
one or more instructions to forward the other traffic to the other network device to be processed as the non-local traffic based on the identification that the other traffic is the non-local traffic.

23. The non-transitory computer-readable medium of claim 16, further comprising:
one or more instructions to identify that other traffic, received from the first user device and destined for a third user device, is local traffic based on a determination that a third eNodeB, via which the third user device communicates, is served by the network device or is served by a further network device that is associated with the other network device.

24. The non-transitory computer-readable medium of claim 23, further comprising:

one or more instructions to transfer the other traffic to the further network device to be processed based on the determination that the third eNodeB is served by the further network device,
where the transferring is performed in a manner that does not include routing the other traffic via the other network device, and
where the processing includes forwarding the other traffic to the third user device via the third eNodeB in a manner that does not include routing the other traffic via the other network device.

* * * * *